(12) United States Patent
Ma et al.

(10) Patent No.: US 7,143,006 B2
(45) Date of Patent: Nov. 28, 2006

(54) POLICY-BASED APPROACH FOR MANAGING THE EXPORT OF NETWORK FLOW STATISTICAL DATA

(75) Inventors: Xiaoxue Ma, Sunnyvale, CA (US); Paul Harry Gleichauf, Saratoga, CA (US); Paul Atkins, Edinburgh (GB)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/088,325

(22) Filed: Mar. 23, 2005

(65) Prior Publication Data
US 2006/0217923 A1 Sep. 28, 2006

(51) Int. Cl.
*G06F 17/08* (2006.01)
(52) U.S. Cl. .................................... 702/179
(58) Field of Classification Search ........ 702/179–181, 702/188, 189; 709/223–226; 370/229, 232
See application file for complete search history.

(56) References Cited

U.S. PATENT DOCUMENTS

| | | | |
|---|---|---|---|
| 6,278,712 B1 * | 8/2001 | Takihiro et al. | 370/400 |
| 2003/0210686 A1 * | 11/2003 | Terrell et al. | 370/389 |
| 2004/0001493 A1 * | 1/2004 | Cloonan et al. | 370/395.42 |
| 2004/0122967 A1 * | 6/2004 | Bressler et al. | 709/232 |
| 2004/0146037 A1 * | 7/2004 | Kubler et al. | 370/347 |
| 2004/0156313 A1 * | 8/2004 | Hofmeister et al. | 370/229 |
| 2004/0174865 A1 * | 9/2004 | O'Neill | 370/352 |
| 2006/0072451 A1 * | 4/2006 | Ross | 370/229 |

* cited by examiner

*Primary Examiner*—Michael Nghiem
(74) *Attorney, Agent, or Firm*—Hickman Palermo Truong & Becker LLP

(57) ABSTRACT

A policy-based approach for managing the export of network flow statistical data uses constraints and prioritization to select flow data to be exported by flow monitoring processes. According to the approach, a flow monitoring process monitors a plurality of flows at an observation point. The flow monitoring process generates flow statistical data for the plurality of flows. Policy data is made available to the flow monitoring process and includes constraint data and priority data. The constraint data indicates usage constraints for one or more resources available to the flow monitoring process. The priority data indicates a desired priority of flow attributes. The flow monitoring process uses the policy data to select one or more flows from the plurality of flows, such that the resource usage constraints are satisfied. The flow monitoring process exports a portion of the flow statistical data that corresponds to the selected one or more flows.

47 Claims, 3 Drawing Sheets

FIG. 2

| FLOW ATTRIBUTE | FLOW ID | | | | |
|---|---|---|---|---|---|
| | 1 | 2 | 3 | 4 | 5 |
| SOURCE ADDRESS | | | | | |
| DESTINATION ADDRESS | | | | | |
| START TIME | | | | | |
| END TIME | | | | | |
| NUMBER OF PACKETS | | | | | |
| NUMBER OF BYTES | | | | | |
| PROTOCOL | | | | | |

FIG. 3

302 — CONFIGURE POLICY DATA TO GIVE HIGHEST PRIORITY TO FLOW STATISTICAL DATA FOR PARTICULAR SOURCE

304 — FLOW MONITORING PROCESSES GENERATE FLOW STATISTICAL DATA

306 — FLOW STATISTICAL DATA SELECTED FOR EXPORT BASED UPON RESOURCE CONSUMPTION AND POLICY DATA

308 — SELECTED FLOW STATISTICAL DATA IS EXPORTED

POLICY-BASED APPROACH FOR MANAGING THE EXPORT OF NETWORK FLOW STATISTICAL DATA

FIELD OF THE INVENTION

This invention relates generally to networking, and more specifically, to a policy-based approach for managing the export of network flow statistical data.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

A variety of flow monitoring tools currently exist to monitor the flow of packets in networks. Flow monitoring tools provide valuable information that can be used in a variety of ways. For example, flow monitoring tools may be used to perform network traffic engineering and to provide network security services, e.g., to detect and address denial of service attacks. As yet another example, flow monitoring tools can be used to support usage-based network billing services.

Flow monitoring tools are conventionally implemented as flow monitoring processes executing on a network element, such as a router. The flow monitoring processes are configured to examine and classify packets passing through a particular point in a network. The flow monitoring processes are also configured to generate flow statistical data that indicates, for example, the number of packets in each flow, the number of bytes in each flow and the protocol of each flow.

There are several definitions of the term "flow" being used by the Internet community. Within the context of Internet Protocol Information eXport (IPFIX), a flow is defined as a set of IP packets passing an observation point in the network during a certain time interval. All packets belonging to a particular flow share a set of common properties. Each property is defined as the result of applying a function to the values of: (1) one or more packet header fields (e.g. destination IP address), transport header fields (e.g. destination port number), or application header fields (e.g. RTP header fields); (2) one or more characteristics of the packet itself (e.g. number of MPLS labels, etc.); or (3) one or more fields derived from packet treatment (e.g. next hop IP address, the output interface, etc.). A packet belongs to a flow if the packet completely satisfies all the defined properties of the flow. This definition covers the range from a flow containing all packets observed at a network interface to a flow consisting of just a single packet between two applications. It includes packets selected by a sampling mechanism.

One of the issues with flow monitoring tools is how to manage the flow statistical data that they generate. Flow monitoring tools can generate large amounts of flow statistical data, particularly in networks with high traffic volume. Flow monitoring processes typically export all of their flow statistical data to a flow collector that aggregates the flow statistical data. This approach can consume a significant amount of computational resources at network elements where the flow monitoring processes are executing, particularly for networks with heavy traffic. Furthermore, the amount of flow statistical data can be so large that exporting the flow statistical data causes additional congestion on network links. This occurs in spite of the fact that consuming processes may be interested in only a subset of the available flow statistical data, so much of the flow statistical data may not be used. Various approaches have been implemented to standardize the export of flow statistical data, for example, through the use of a common transport mechanism, to facilitate services such as network management, accounting and billing. None of these approaches adequately address the problem of how to regulate the export of flow statistical data to control the consumption of resources and reduce network congestion. Based on the foregoing, there is a need for an approach for managing network flow statistical data that does not suffer from limitations of prior approaches.

BRIEF DESCRIPTION OF THE DRAWINGS

In the figures of the accompanying drawings like reference numerals refer to similar elements.

FIG. 2 is a table that depicts an example of flow statistical data for five flows.

FIG. 3 is a flow diagram that depicts an operational example in the context of flow consumer analyzing flow statistical data from a particular source.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. NETWORK FLOW MANAGEMENT ARCHITECTURE
III. POLICY DATA
IV. CONSTRAINT DATA
V. PRIORITY DATA
VI. OPERATIONAL EXAMPLE
VII. IMPLEMENTATION MECHANISMS

I. Overview

A policy-based approach for managing the export of network flow statistical data uses constraints and prioritization to select flow statistical data to be exported. According to the approach, a flow monitoring process monitors a plurality of flows at an observation point. The flow monitoring process generates flow statistical data for the plurality of flows. Policy data is made available to the flow monitoring process and includes constraint data and priority data. The constraint data indicates usage constraints for one or more resources available to the flow monitoring process. The priority data indicates a desired priority of flow attributes. The flow monitoring process uses the policy data to select one or more flows from the plurality of flows, such that the resource usage constraints are satisfied. The flow monitoring process exports a portion of the flow statistical data that corresponds to the selected one or more flows. The approach allows limits to be placed on the amount of resources that are consumed by flow monitoring processes and reduces network congestion attributable to the exportation of flow data. The approach also provides for prioritization of flow monitoring, which is very useful in situations where it is desirable to monitor particular flows.

II. Network Flow Management Architecture

Figure 1:
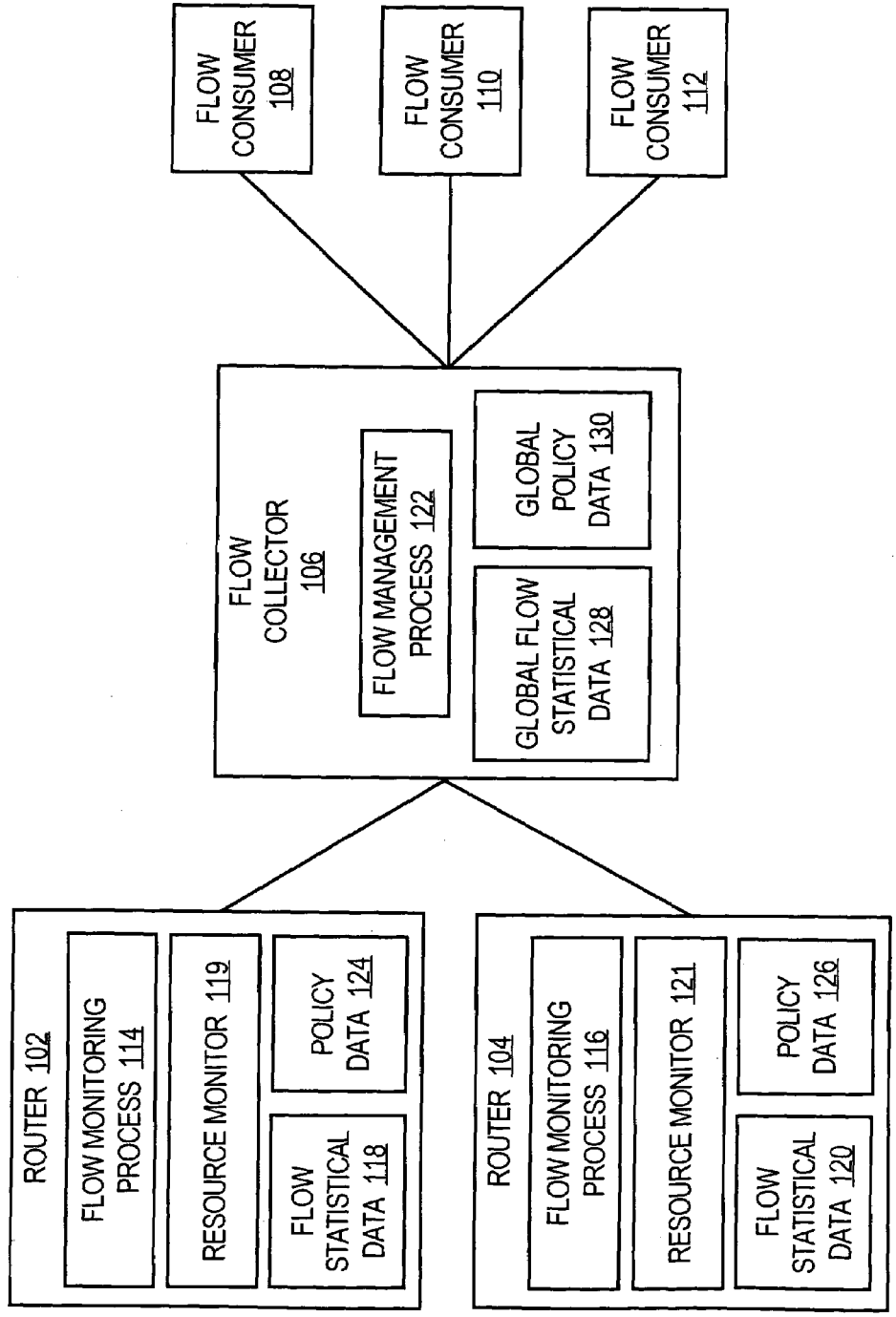
FIG. 1 is a block diagram that depicts an arrangement for implementing policy-based management of network flow statistical data.

FIG. 1 is a block diagram that depicts an arrangement 100 for implementing policy-based management of network flow statistical data, according to an embodiment of the invention. Arrangement 100 includes routers 102, 104, communicatively coupled to a flow collector 106. Flow collector 106 is also communicatively coupled to flow consumers 108, 110, 112. Routers 102, 104, flow collector 106 and flow consumers 108, 110, 112 may be communicatively coupled via any mechanism or medium that provides for the exchange of data between these elements. Examples include, without limitation, a network such as a Local Area Network (LAN), Wide Area Network (WAN), Ethernet or the Internet, or one or more terrestrial, satellite or wireless links.

Routers 102, 104 are configured with flow monitoring processes 114, 116, respectively, that monitor packets passing through routers 102, 104 and generate flow statistical data 118, 120. Flow monitoring processes 114, 116 are also configured to export flow statistical data 118, 120 to flow collector 106. Although various embodiments of the invention are described herein in the context of flow monitoring processes being implemented on routers 102, 104, the approach is not limited to the router context. The approach may be implemented on any network element or device where a flow monitoring process can execute and perform its intended functions. Examples of such devices include, without limitation, gateways, Web servers, switches and any other type of network device or element. Although embodiments of the invention are described in the context of two flow monitoring processes (114, 116), one flow collector 106 and three flow consumers (108, 110, 112), the approach is applicable to any number of flow monitoring processes, flow collectors and flow consumers.

Flow statistical data 118, 120 may include flow statistical data for any number of flows passing through routers 102, 104, respectively. In practice, it would not be uncommon for flow statistical data 118, 120 to include flow statistical data for a large number of flows. The particular statistical data included in flow statistical data 118, 120 may vary widely, depending upon the requirements of a particular implementation, and how flow monitoring processes 114, 116 are configured. The contents of flow statistical data 118, 120 may be specific to routers 102, 104 and thus different from each other.

FIG. 2 is a table 200 that depicts an example flow statistical data for five flows, identified as flows 1–5. The data for table 200 may be obtained by flow monitoring processes 114, 116 examining the contents of packets passing through routers 102, 104. The flow attributes in table 200 include, for each flow, a source address, a destination address, a start time, and end time, number of packets, number of bytes and protocol. The source address is the source IP address of the flow. The destination address is the destination IP address of the flow. The start time is the time at which the first packet in the flow was received. The end time is the time at which the last packet in the flow was received. The number of packets is the number of packets in the flow. The number of bytes is the number of bytes in the flow. The protocol is the protocol of the flow. Example protocols include, without limitation, at the application layer, hypertext transfer protocol (HTTP); simple mail transfer protocol (SMTP); file transfer protocol (FTP); at the transport layer, transmission control protocol (TCP) and user datagram protocol (UDP); and at the network layer, Internet Protocol version 4 (Ipv4) and Internet control message protocol (ICMP).

Flow statistical data 118, 120 may be stored in a volatile memory, such as a random access memory (RAM), in a non-volatile storage, such as one or more disks, optical storage devices or tape devices, or any combination thereof. Given that the sizes of flow statistical data 118, 120 generally grow over time, routers 102, 104 are conventionally configured to manage the amount of flow statistical data 118, 120 maintained on routers 102, 104. This may include deleting flow statistical data that is determined to be the least useful to make storage space available for more useful flow statistical data. For example, routers 102, 104 may delete from memory flow statistical data for the oldest flows or flow statistical data for the smallest flows. As another example, flow statistical data for particular flows that are not currently of interest, as indicated by administrative personnel, may be deleted. Many other memory management techniques may be employed, depending upon the requirements of a particular implementation.

Routers 102, 104 are also configured with resource monitors 119, 121 that monitor resource usage on routers 102, 104. For example, resource monitors 119, 121 may monitor the consumption of CPU resources, storage resources or bandwidth. As described in more detail hereinafter, flow monitoring processes 114, 116 use the information provided by resource monitors 119, 121, in conjunction with policy data, to manage the export of flow statistical data 118, 120. Resource monitors 119, 121 may be implemented by a wide variety of processes, depending upon how routers 102, 104 are configured.

Flow collector 106 is a mechanism configured to receive flow statistical data from flow monitoring processes 114, 116 and provide the flow statistical data to flow consumers 108, 110, 112. As with routers 102, 104, flow collector 106 may store flow statistical data in volatile or non-volatile memory and may be configured to employ memory management techniques to manage the available storage space by deleting certain flow statistical data. Flow collector 106 may also be configured to perform processing on the flow statistical data. For example, flow collector 106 may aggregate flow statistical data or perform statistical analysis on the flow statistical data. Flow collector 106 may include various flow data management processes for managing flow statistical data received from flow monitoring processes 114, 116. For example, flow collector 106 may include a flow management process 122 that allows administrative personnel to view flow statistical data on a flow-by-flow basis. The flow management process 122 may also allow administrative personnel to configure the memory management processes, for example, to delete flow statistical data based upon the age of flows or the size of flows. In some situations, multiple flow collectors may be used, for example, to provide redundancy.

Flow consumers 108, 110, 112 may be implemented by any mechanism or process configured to receive and use flow statistical data from flow collector 106. Example processes include, without limitation, network management applications, billing applications and security applications.

III. Policy Data

According to one embodiment of the invention, routers 102, 104 include policy data 124, 126, respectively, that is used to control how flow monitoring processes 114, 116 export flow statistical data 118, 120 to flow collector 106 or to other entities. Policy data 124, 126 may be the same for all routers 102, 104, or may be router-specific, depending upon the requirements of a particular implementation. Policy data 124, 126 may be made available to routers 102, 104 in a variety of ways. For example, policy data 124, 126 may be generated and maintained at a central location by administrative personnel and distributed to routers 102, 104. Flow management process 122 might be used for this purpose. As another example, policy data 124, 126 may be generated and maintained at routers 102, 104. Policy data 124, 126 may be generated through a graphical user interface (GUI), for example, using a command line editor (CLE). Alternatively, policy data 124, 126 may be generated using a generic text editor. Policy data 124, 126 may be dynamically updated over time, as necessary. Policy data 124, 126 may also be created and updated through a programmatic interface, allowing the policy-based export scheme to be controlled by an external management application. As is described in more detail hereinafter, policy data may be selected based upon manual profiling of network traffic and business rationale. Policy data may be stored in volatile memory, such as a random access memory (RAM), in a non-volatile storage, such as one or more disks, optical storage devices or tape devices, or any combination thereof. According to one embodiment of the invention, policy data 124, 126 includes constraint data and priority data.

IV. Constraint Data

The constraint data indicates usage constraints for one or more resources available to flow monitoring processes 114, 116 on routers 102, 104. The usage constraints may apply to any type of resource available to flow monitoring processes 114, 116. For example, the constraint data may specify an amount of available processing resources that can be allocated to exporting flow statistical data. As another example, the constraint data may specify an amount of available bandwidth that can be allocated to exporting flow statistical data. As yet another example, the constraint data may specify an amount of storage resources that may be used to store flow statistical data. Many other constraints are possible, depending upon the resources available to flow monitoring processes 114, 116, and the invention is not limited to any particular constraints.

Constraints may be expressed as absolute limits or as percentages of available resources. For example, the constraint data may specify that no more than a specified amount of processing power, or no more than a percentage of available processing resources may be used for exporting flow statistical data. As another example, the constraint data may specify that no more than a specified amount of bandwidth, or no more than a specified percentage of the available bandwidth of router 102 may be used for exporting flow statistical data. As yet another example, the constraint data may specify a maximum amount of storage, or a maximum percentage of available storage, that may be used for storing flow statistical data on router 102. Once the specified amount of storage has been used, flow statistical data is deleted from router 102. For example, a time-based approach may be used to delete the oldest flow statistical data first to make space for additional flow statistical data.

The use of constraint data protects routers 102, 104 by limiting the amount of resources that can be consumed by the generation, storage and exportation of flow statistical data. This is valuable in situations where network traffic is highly variable and/or heavy and it is desirable to limit the adverse performance impact that a flow monitoring process has on the processing platform on which it executes. For example, suppose that a denial of service attack was made on router 102, causing an exceptionally large and rapid increase in network traffic through router 102. Under normal circumstances, flow monitoring process 114 would begin to consume a greater amount of processing and storage resources as it processes the increased number of packets and generates flow statistical data. Exporting the increased amount of flow statistical data would also consume a larger amount of available bandwidth of routers 102, 104. In some situations, this can adversely impact other processes executing on router 102 and increase packet congestion. The usage constraints specified by the constraint data in policy data 124 limit the amount of resources that can be consumed by flow monitoring process 114. Thus, the usage constraints can limit the adverse impact on other processes caused by flow monitoring process 114, even when large and unexpected increases in network traffic occur. This in turn may provide the benefit that administrative personnel and customers may be more likely to leave flow monitoring processes 114, 116 running all the time, given the assurances that the amount of resources consumed by flow monitoring processes 114, 116 can be controlled. Any number and type of usage constraints may be used, depending upon the requirements of a particular application, and the approach is not limited to any particular usage constraints or the particular examples provided herein.

V. Priority Data

The priority data indicates a desired priority of flow attributes. Flow monitoring processes use the priority data to select the order in which flow statistical data is exported. According to one embodiment of the invention, the priority data is used to select one or more flows for which the corresponding flow statistical data is to be exported, such that the resource usage constraints specified by the constraint data are satisfied. Thus, the flow attribute priorities may be used in combination with the resource usage constraints to select a subset of available flow statistical data for export, given the current consumption of resources. The subset of flow statistical data selected is the flow statistical data for the flows having attributes with the highest priority.

The particular priority of flow attributes may vary widely, depending upon the particular implementation, and the invention is not limited to any particular priority of flow attributes. For example, flow priority may be based upon flow origination or destination, as determined by the origination and destination IP addresses of packets. This may be useful in situations where a particular source, or a set of sources, is suspect and it is desirable to monitor the flows originating from the particular source, or set of sources. For example, suppose that a particular network device is suspect. Flows originating from the particular network device are given a higher priority than flows originating from other network devices, so that a security program may analyze flows originating from the particular network device. This may be performed by examining packets and giving packets having an IP address associated with the particular network device a higher priority than other packets. As another example, flow priority may be based upon the size of flows, as determined from the number of packets or number of bytes, or the duration of flows, as determined by the start and/or end times. For billing or business purposes it may be useful to give larger flows a higher priority. As yet another example, flow priority may be based upon protocol. This may be useful in situations where certain protocols are more susceptible to abuse. It may also be useful in situations where it is desirable that flow statistical data for certain processes, such as Web servers, be given a higher priority. These examples are provided to aid in understanding how the export of flow statistical data may be controlled using flow priorities and the invention is not limited to prioritizing flows based upon the particular flow attribute examples provided herein. Flow prioritization may be made using any available flow attribute. Furthermore, flow prioritization may change over time, depending upon the requirements of a particular implementation. For example, the priority data in policy data 124, 126 may be updated to reflect a change in business needs. Flow priority may also be qualified by context. For example, under normal operating conditions, flow prioritization may be based upon flow size. When a pattern of abuse is detected, for example, when a network is under a denial of service attack, then flow prioritization may be based upon protocol to enable corrective mechanisms to be implemented to preserve average billable traffic flows.

VI. Operational Example

FIG. 3 is a flow diagram that depicts an operational example of the policy-based approach for managing the export of network flow statistical data in the context of flow consumer 108 analyzing flow statistical data from a particular source. In step 302, priority data contained in policy data 124, 126 is configured to give the highest priority to flow statistical data 118, 120 associated with flows originating from the particular source. Constraint data contained in policy data 124, 126 may also be configured to specify a maximum amount or percentage of resources to be used for exporting the flow statistical data 118, 120. Policy data 124, 126 may be configured, for example, by administrative personnel directly on routers 102, 104. Policy data 124, 126 may also be generated by administrative personnel at flow collector 106, using flow management process 122, and then distributed to routers 102, 104.

In step 304, flow monitoring processes 114, 116 generate flow statistical data 118, 120, respectively, based upon packets passing through routers 102, 104. In step 306, particular flow statistical data 118, 120 is selected for export based upon the policy data and the current consumption of resources, as indicated by resource monitors 119, 121. In the present example, the flows originating from the particular source are identified based upon the IP address of the particular source. These flows are given the highest priority. Then the flow statistical data 118, 120 for the identified flows is selected for export based upon the policy data and the current consumption of resources. In some situations, even though the identified flows originating at the particular source are given the highest priority, not all of the flow statistical data for the identified flows may be exported. This may occur, for example, if the amount of flow statistical data for the identified flows exceeds the resource usage constraints, given the current consumption of resources. In these situations, the selection of flow statistical data for export may be made, for example, based upon the size of the flows. For example, the flow statistical data for the largest N number of flows originating from the particular source may be selected for export. In other situations, the flow statistical data for all flows originating from the particular source may not exceed the resource usage constraints, based upon the current resource consumption. In these situations, flow statistical data for other flows may be exported.

In step 308, the selected flow statistical data is exported from routers 102, 104 to flow collector 106. The selected flow statistical data is then provided from flow collector 106 to flow consumer 108, where it is processed.

As may be understood from the foregoing example, the current consumption of resources provides a local feedback mechanism for the export of flow statistical data. Specifically, the export of flow statistical data affects the consumption of resources, which in turn drives the export behavior based upon the policy data.

According to another embodiment of the invention, global flow statistical data 128 and global policy data 130 are provided. Global flow statistical data 128 is statistical data for flows passing through flow collector 106. In FIG. 1, this includes flows from routers 102, 104, but in practice may include flows from any number of sources. The availability of global flow statistical data 128 may be helpful in detecting events, conditions or patterns at a "global" level from multiple sources, that may not necessarily be detected at a "local" level, e.g., from a single source. For example, in denial of service attacks, individual sources, such as routers 102, 104, may not be aware of or be able to detect a coordinated effort to overload network resources. This type of attack however, may be detected at flow collector 106, since flow data can be analyzed from multiple sources. In this situation, policy data 124, 126 may be updated to reflect global statistical data 128 and global policy data 130. For example, policy data 124, 126 may be updated to provide a higher priority to particular protocols than to flow size. After other automatic or manual administrative actions have addressed the problem, policy data 124, 126 may be returned to their normal operational values. Thus, this approach provides a second "global" feedback mechanism to regulate the export of flow statistical data.

VII. Implementation Mechanisms

Figure 4:
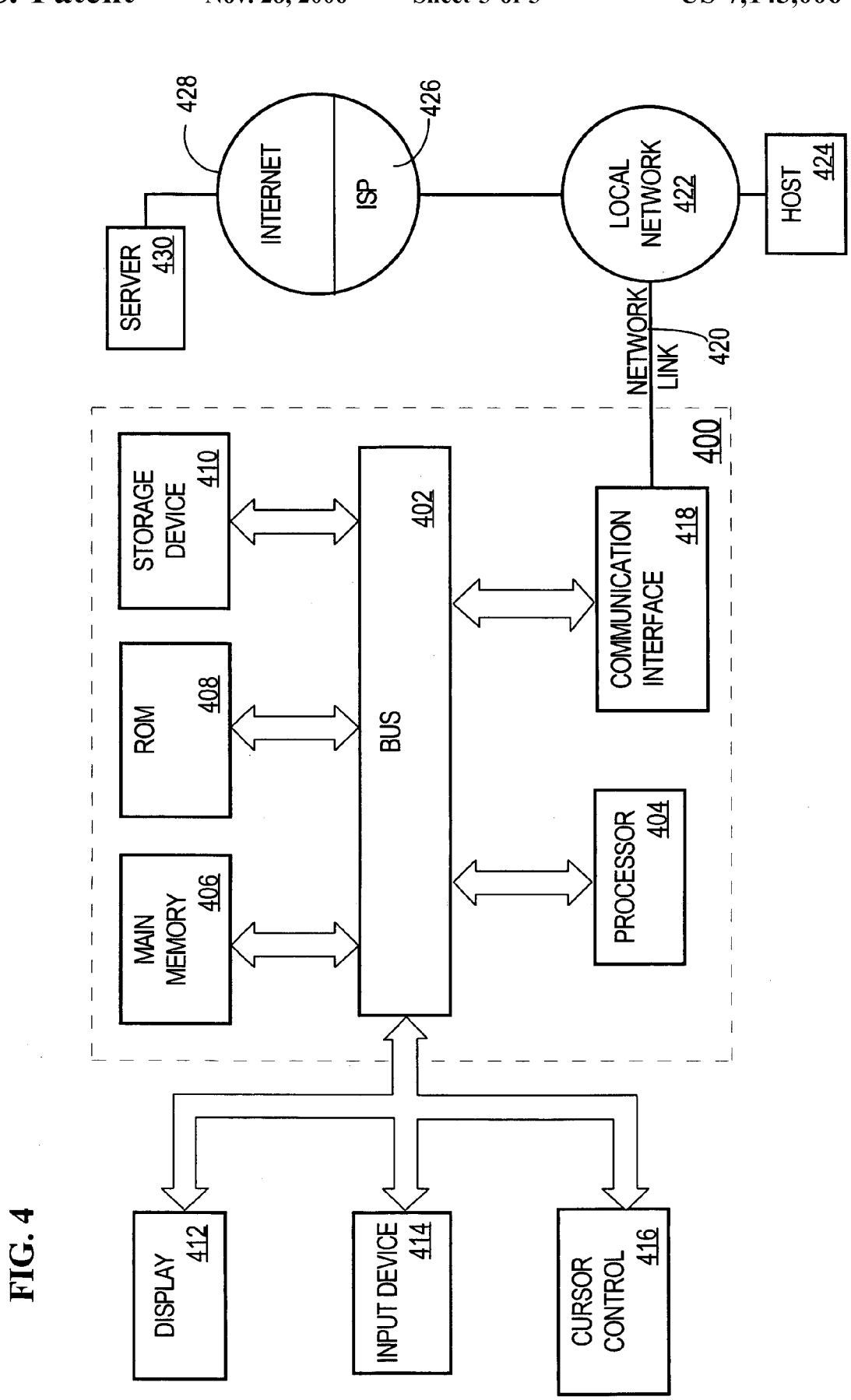
FIG. 4 is a block diagram of a computer system on which embodiments of the invention may be implemented.

The policy-based approach for managing the export of network flow statistical data may be implemented in flow monitoring processes, such as flow monitoring processes 114, 116 as described herein, or in separate processes on routers 102, 104. The approach may be implemented on any type of computing architecture. FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for implementing the techniques described herein. According to one embodiment of the invention, those techniques are performed by computer system 400 in response to processor 404 executing one or more sequences of one or more instructions contained in main memory 406. Such instructions may be read into main memory 406 from another machine-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 400, various machine-readable media are involved, for example, in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. The received code may be executed by processor 404 as it is received, and/or stored in storage device 410, or other non-volatile storage for later execution. In this manner, computer system 400 may obtain application code in the form of a carrier wave.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method for managing network flow statistical data, the computer-implemented method comprising:

a monitoring process monitoring a plurality of flows at an observation point in a network;

the monitoring process generating flow statistical data for the plurality of flows;

the monitoring process retrieving local policy data that includes constraint data and priority data, wherein the constraint data indicates one or more resource usage constraints for one or more resources available to the monitoring process and the priority data indicates a desired priority of flow attributes;

the monitoring process selecting one or more flows from the plurality of flows based upon the constraint data and the priority data so that the one or more resource usage constraints data are satisfied; and the monitoring process exporting a portion of the flow statistical data that corresponds to the selected one or more flows for use by a consumer.

2. The computer-implemented method as recited in claim 1, further comprising:

ranking the flows in the plurality of flows based upon the priority data; and the selecting the one or more flows includes selecting the one or more flows based upon the ranking of the flows and the constraint data such that the selected one or more flows satisfy the constraint data.

3. The computer-implemented method as recited in claim 1, wherein the priority data indicates that flow size is given the highest priority.

4. The computer-implemented method as recited in claim 1, wherein the priority data indicates that flow duration is given the highest priority.

5. The computer-implemented method as recited in claim 1, wherein the priority data indicates that flows associated with a particular source or destination are given the highest priority.

6. The computer-implemented method as recited in claim 1, wherein the priority data indicates that flow protocol is given the highest priority.

7. The computer-implemented method as recited in claim 1, wherein the resource constraints specify a maximum percentage or maximum amount of the one or more resources that can be used for exporting the portion of the flow statistical data.

8. The computer-implemented method as recited in claim 1, wherein the resource constraints specify a maximum percentage or maximum amount of available processing resources that can be used for exporting the portion of the flow statistical data.

9. The computer-implemented method as recited in claim 1, wherein the resource constraints specify a maximum percentage or maximum amount of available storage resources that can be used for exporting the portion of the flow statistical data.

10. The computer-implemented method as recited in claim 1, wherein the resource constraints specify a maximum percentage or maximum amount of available communications bandwidth that can be used for exporting the portion of the flow statistical data.

11. The computer-implemented method as recited in claim 1, further comprising:
monitoring current usage of the one or more resources; and
re-selecting the one or more flows from the plurality of flows based upon the constraint data, the priority data and the current usage of the one or more resources.

12. The computer-implemented method as recited in claim 1, further comprising:
receiving global flow statistical data that reflects the monitoring of flows at two or more other observation points in the network;
analyzing the global flow statistical data; and
updating the local policy data to reflect the global flow statistical data and global policy data.

13. A computer-readable medium for managing network flow statistical data, the computer-readable medium comprising instructions which, when executed by one or more processors, cause:
a monitoring process monitoring a plurality of flows at an observation point in a network;
the monitoring process generating flow statistical data for the plurality of flows;
the monitoring process retrieving local policy data that includes constraint data and priority data, wherein the constraint data indicates one or more resource usage constraints for one or more resources available to the monitoring process and the priority data indicates a desired priority of flow attributes;
the monitoring process selecting one or more flows from the plurality of flows based upon the constraint data and the priority data so that the one or more resource usage constraints data are satisfied; and
the monitoring process exporting a portion of the flow statistical data that corresponds to the selected one or more flows for use by a consumer.

14. The computer-readable medium as recited in claim 13, further comprising additional instructions which, when executed by the one or more processors, cause
ranking the flows in the plurality of flows based upon the priority data; and
the selecting the one or more flows includes selecting the one or more flows based upon the ranking of the flows and the constraint data such that the selected one or more flows satisfy the constraint data.

15. The computer-readable medium as recited in claim 13, wherein the priority data indicates that flow size is given the highest priority.

16. The computer-readable medium as recited in claim 13, wherein the priority data indicates that flow duration is given the highest priority.

17. The computer-readable medium as recited in claim 13, wherein the priority data indicates that flows associated with a particular source or destination are given the highest priority.

18. The computer-readable medium as recited in claim 13, wherein the priority data indicates that flow protocol is given the highest priority.

19. The computer-readable medium as recited in claim 13, wherein the resource constraints specify a maximum percentage of the one or more resources that can be used for exporting the portion of the flow statistical data.

20. The computer-readable medium as recited in claim 13, wherein the resource constraints specify a maximum percentage of available processing resources that can be used for exporting the portion of the flow statistical data.

21. The computer-readable medium as recited in claim 13, wherein the resource constraints specify a maximum percentage of available storage resources that can be used for exporting the portion of the flow statistical data.

22. The computer-readable medium as recited in claim 13, wherein the resource constraints specify a maximum percentage of available communications bandwidth that can be used for exporting the portion of the flow statistical data.

23. The computer-readable medium as recited in claim 13, further comprising additional instructions which, when executed by the one or more processors, cause:
monitoring current usage of the one or more resources; and
re-selecting the one or more flows from the plurality of flows based upon the constraint data, the priority data and the current usage of the one or more resources.

24. The computer-readable medium as recited in claim 13, further comprising additional instructions which, when executed by the one or more processors, cause:
receiving global flow statistical data that reflects the monitoring of flows at two or more other observation points in the network;
analyzing the global flow statistical data; and
updating the local policy data to reflect the global flow statistical data and global policy data.

25. An apparatus for managing network flow statistical data, the apparatus comprising a memory storing instructions which, when executed by one or more processors, cause:
a monitoring process monitoring a plurality of flows at an observation point in a network;
the monitoring process generating flow statistical data for the plurality of flows;
the monitoring process retrieving local policy data that includes constraint data and priority data, wherein the constraint data indicates one or more resource usage constraints for one or more resources available to the monitoring process and the priority data indicates a desired priority of flow attributes;

the monitoring process selecting one or more flows from the plurality of flows based upon the constraint data and the priority data so that the one or more resource usage constraints data are satisfied; and the monitoring process exporting a portion of the flow statistical data that corresponds to the selected one or more flows for use by a consumer.

26. The apparatus as recited in claim 25, wherein the memory stores additional instructions which, when executed by the one or more processors, cause ranking the flows in the plurality of flows based upon the priority data; and the selecting the one or more flows includes selecting the one or more flows based upon the ranking of the flows and the constraint data such that the selected one or more flows satisfy the constraint data.

27. The apparatus as recited in claim 25, wherein the priority data indicates that flow size is given the highest priority.

28. The apparatus as recited in claim 25, wherein the priority data indicates that flow duration is given the highest priority.

29. The apparatus as recited in claim 25, wherein the priority data indicates that flows associated with a particular source or destination are given the highest priority.

30. The apparatus as recited in claim 25, wherein the priority data indicates that flow protocol is given the highest priority.

31. The apparatus as recited in claim 25, wherein the resource constraints specify a maximum percentage of the one or more resources that can be used for exporting the portion of the flow statistical data.

32. The apparatus as recited in claim 25, wherein the resource constraints specify a maximum percentage of available processing resources that can be used for exporting the portion of the flow statistical data.

33. The apparatus as recited in claim 25, wherein the resource constraints specify a maximum percentage of available storage resources that can be used for exporting the portion of the flow statistical data.

34. The apparatus as recited in claim 25, wherein the resource constraints specify a maximum percentage of available communications bandwidth that can be used for exporting the portion of the flow statistical data.

35. The apparatus as recited in claim 25, wherein the memory stores additional instructions which, when executed by the one or more processors, cause:

monitoring current usage of the one or more resources; and re-selecting the one or more flows from the plurality of flows based upon the constraint data, the priority data and the current usage of the one or more resources.

36. The apparatus as recited in claim 25, wherein the memory stores additional instructions which, when executed by the one or more processors, cause:

receiving global flow statistical data that reflects the monitoring of flows at two or more other observation points in the network;

analyzing the global flow statistical data; and updating the local policy data to reflect the global flow statistical data and global policy data.

37. An apparatus for managing network flow statistical data, the apparatus comprising:

means for monitoring a plurality of flows at an observation point in a network;

means for generating flow statistical data for the plurality of flows;

means for retrieving local policy data that includes constraint data and priority data, wherein the constraint data indicates one or more resource usage constraints for one or more resources available to the monitoring process and the priority data indicates a desired priority of flow attributes;

means for selecting one or more flows from the plurality of flows based upon the constraint data and the priority data so that the one or more resource usage constraints data are satisfied; and means for exporting a portion of the flow statistical data that corresponds to the selected one or more flows for use by a consumer.

38. The apparatus as recited in claim 37, further comprising means for ranking the flows in the plurality of flows based upon the priority data; and the selecting the one or more flows includes selecting the one or more flows based upon the ranking of the flows and the constraint data such that the selected one or more flows satisfy the constraint data.

39. The apparatus as recited in claim 37, wherein the priority data indicates that flow size is given the highest priority.

40. The apparatus as recited in claim 37, wherein the priority data indicates that flows associated with a particular source or destination are given the highest priority.

41. The apparatus as recited in claim 37, wherein the priority data indicates that flow protocol is given the highest priority.

42. The apparatus as recited in claim 37, wherein the resource constraints specify a maximum percentage of the one or more resources that can be used for exporting the portion of the flow statistical data.

43. The apparatus as recited in claim 37, wherein the resource constraints specify a maximum percentage of available processing resources that can be used for exporting the portion of the flow statistical data.

44. The apparatus as recited in claim 37, wherein the resource constraints specify a maximum percentage of available storage resources that can be used for exporting the portion of the flow statistical data.

45. The apparatus as recited in claim 37, wherein the resource constraints specify a maximum percentage of available communications bandwidth that can be used for exporting the portion of the flow statistical data.

46. The apparatus as recited in claim 37, further comprising:

means for monitoring current usage of the one or more resources; and means for re-selecting the one or more flows from the plurality of flows based upon the constraint data, the priority data and the current usage of the one or more resources.

47. The apparatus as recited in claim 37, further comprising:

means for receiving global flow statistical data that reflects the monitoring of flows at two or more other observation points in the network;

means for analyzing the global flow statistical data; and means for updating the local policy data to reflect the global flow statistical data and global policy data.

* * * * *